Patented May 5, 1936

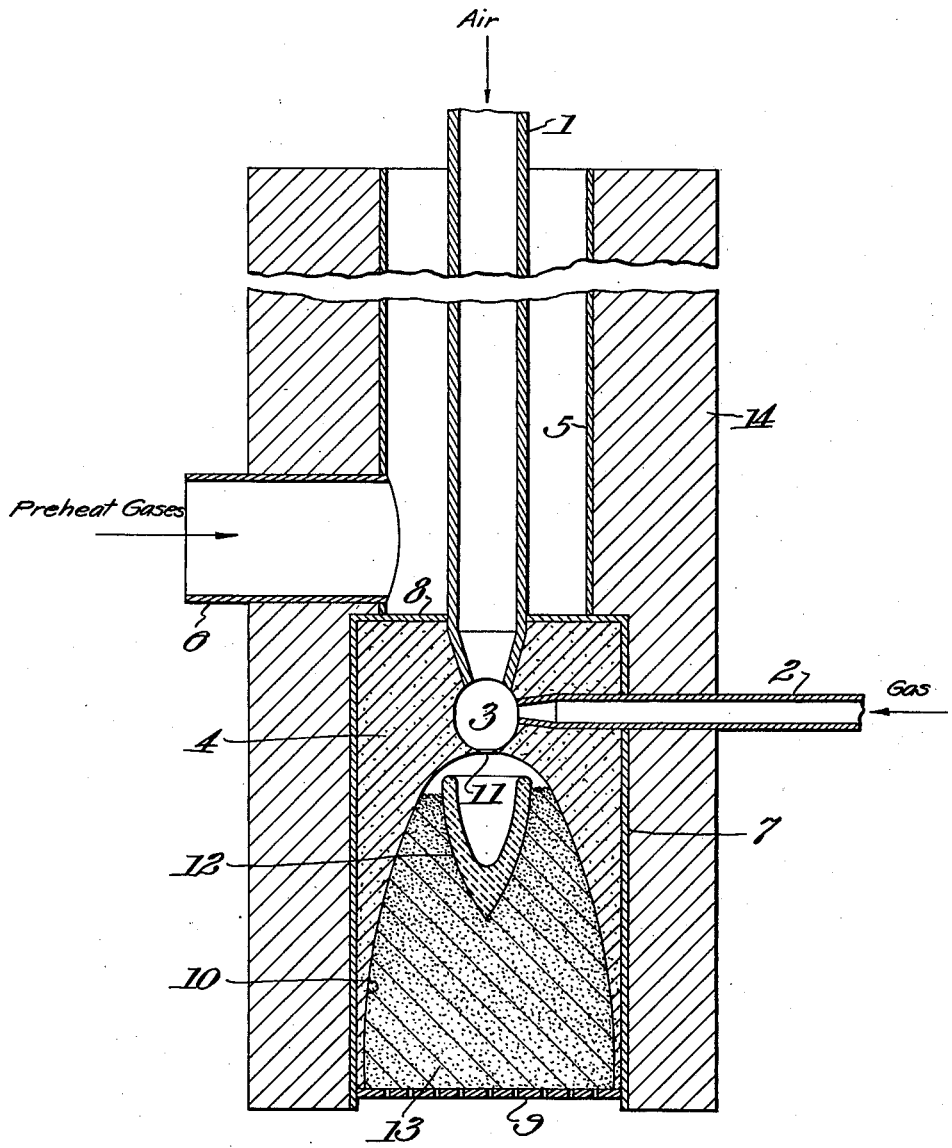

2,039,603

UNITED STATES PATENT OFFICE 2,039,603

METHOD FOR THE PRODUCTION OF HOT REDUCING GASES

Charles G. Maier, Berkeley, Calif., assignor, by mesne assignments, to The Mountain Copper Company, Ltd., a corporation of Great Britain Application May 7, 1932, Serial No. 609,965

5 Claims. (Cl. 48—196)

This invention relates to the conversion of hydrocarbons into a gaseous product consisting essentially of carbon monoxide and hydrogen, substantially free of higher oxidation products such as water vapor and carbon dioxide and at a high temperature, suitable for use as a metallurgical heating and reducing agent. The invention is particularly designed and adapted for the conversion of natural gas into a highly heated metallurgical reducing gas and will be described and illustrated in this connection, it being apparent that the method and apparatus to be described hereinafter are equally adapted to the conversion of any hydrocarbon or mixture, whether normally gaseous or rendered gaseous by heat.

It has been proposed heretofore to pass mixtures of hydrocarbons such as methane with steam or carbon dioxide in contact with a heated catalytic material, such as nickel or other well-known materials of similar catalytic properties, for the purpose of producing a combustible or reducing gas mixture. This process requires a supply of heat from an external source, and it has been proposed to introduce air to react with the hydrocarbon and yield the necessary heat. This process has proved to be unsatisfactory in that it results in an increased content of carbon dioxide and/or water vapor in the gas which has a detrimental effect on its reducing action in metallurgical processes.

In accordance with the present invention the hydrocarbon is caused to react in the presence of a catalyst or contact mass with a definite and limited supply of dry air whereby part of the heat necessary for the reaction is supplied by the reactions inherent in the process. The supply of air must be regulated so that the oxygen content thereof is just sufficient to convert the carbon content of the hydrocarbon to carbon monoxide, but insufficient to form appreciable amounts of carbon dioxide or water. The gaseous product, of course, contains the nitrogen content of the air supply as an inert ingredient.

In the case of pure methane, and taking the composition of air to be 80% nitrogen and 20% oxygen, the ratio of methane to air should be 2 volumes of methane to 5 volumes of air. The proportion of air to hydrocarbon in the case of other hydrocarbons or mixtures readily may be calculated to supply one atom of oxygen for each atom of carbon.

In order to supply the deficiency of heat necessary for carrying on the reaction without supplying an excess of air and thereby producing a gas containing higher oxidation products, it has been proposed to preheat the air supply, but in attempting to carry out this proposal I have found that in most cases such excessively high local temperatures are produced that the catalytic mass is fused and rendered ineffective and that parts of the conversion apparatus may be destroyed. A feature of my invention therefore resides in the provision of a procedure and means whereby the deficiency of heat may be supplied to the reaction by preheating the air supply without local overheating of the catalytic mass.

In order to secure the desired continuous operation of the process yielding a gas of low carbon dioxide and/or water vapor content, a temperature in the catalytic mass of about 1000° C. is required. Considering the amount of heat generated by the reaction and unavoidable heat losses, it may be determined that a preheating of the air supply to about 800–1000° C. is required. Careful investigation has indicated that the specific problems to be solved in reacting a hydrocarbon with a supply of air preheated to this temperature in the presence of a catalyst are (1) securing a good mixing of the gas and air, (2) avoiding a flame at the point of mixing, and (3) avoiding having the reaction stages involved take place in zones in the catalytic mass. It may be noted that a hydrocarbon cannot ordinarily be preheated to a temperature higher than about 400° C. without decomposition. Therefore, in mixing the hydrocarbon with the preheated air, decomposition of the hydrocarbon and deposition of carbon on the catalytic mass is to be avoided.

The reaction between a hydrocarbon and air or oxygen to carbon monoxide and hydrogen occurs in stages, the first stages being extremely rapid and quite exothermic and accompanied by the formation of considerable amounts of carbon dioxide and water, while the subsequent stages are slower and endothermic and tend to convert the carbon dioxide and water formed in the first stage into carbon monoxide and hydrogen, but in order to complete this conversion the temperature of the gas mixture must be kept sufficiently high. The later stages of the reaction would be promoted, therefore, by transferring heat from the zone of the first stages to the zone of the later stages, but the normal tendency is for the zone of the first stages to become too highly heated, while the zone of the later stages becomes too cool to complete the reaction and the resulting gas contains objectionable amounts of carbon dioxide and water vapor. The difficulties referred to are overcome principally by an intimate mixing of the heated air and hydrocarbon gas and passing the mixture in contact with a catalyst mass in such a way that the endothermic and exothermic steps of the reaction occur essentially together and in the absence of flame and thereby neutralize each other so that spatially separated zones of reaction are avoided.

An apparatus in which the method has been successfully carried out and which typifies the principles involved is illustrated in the accompanying drawing which is a diagrammatic vertical section, with parts in elevation, of the essential parts of the apparatus.

Referring to the drawing, 1 is the air supply pipe and 2 the gas supply pipe, both narrowed to nozzles at their inner ends where they enter the substantially spherical mixing chamber 3 formed in the body of refractory material 4. The pipe 1 is surrounded by the pipe 5 which is provided with an entering flue 6 for flame or hot combustion gases. The refractory mass 4 is formed within the shell comprising the side wall 7 having an opening to receive the pipe 2, the end wall 8 having an opening to receive the pipe 1 and the grating 9. The pipes 1, 2 and 5, flue 6, the side wall 7, end wall 8 and grating 9 preferably are formed of a suitable refractory alloy such as the well-known chrome-nickel steels. The refractory mass 4 may be formed of any suitable material such as crystalline alumina or magnesia cement molded or tamped into place so as to surround the ends of the pipes 1 and 2 and leave the spherical cavity 3 and the semi-ellipsoidal cavity 10 which communicate through the orifice 11. Directly below the orifice 11 within the cavity 10 is the deflector 12 which is thimble shaped and formed of suitable refractory material, such as magnesia cement. Gases leaving the chamber 3 through the orifice 11 pass into the cavity of the deflector 12 and flow over its upper edge and then downwardly through the porous catalytic mass 13. The deflector 12 is supported in the catalytic mass 13 which fills the cavity 10 excepting the space within the deflector 12 and above its upper edge. The catalytic mass 13 may be any suitable oxidation catalyst, such as a granular refractory material, e. g. porous crystalline alumina impregnated with nickel salts or nickel oxide. The whole structure above described is surrounded by the refractory and heat insulating mass 14.

In operation hydrocarbon gas and preheated air enter the chamber 3 through pipes 2 and 1, the air being preheated to a temperature of 800–1000° C. by hot combustion gases or flame entering through the pipe 6 and passing up through the pipe 5 in contact with the pipe 1. The nozzle ends of pipes 1 and 2 are made of such size that they deliver the gas and air into the chamber 3 in proper proportion and at a velocity exceeding the flame propagation rate. The gas and air streams impinging in the chamber 3 are efficiently mixed and the mixing is made more complete by the passage of the mixture through the orifice 11, and its movement into and out of the cavity of the deflector 12 and over its upper edge downwardly into the catalytic mass. The size of the chamber 3, orifice 11, the cavity in the deflector 12 and the passageway between the upper edge of the deflector 12 and the wall of cavity 10 and between the outer wall of the deflector 12 and the adjacent wall of the cavity 10 are such that the flow of the gases exceeds the flame propagation rate until the gases reach a point about half way down the outer wall of the deflector 12 in the catalytic mass. Under these conditions it is found that the reaction zones and zones of concentration of heat above referred to do not occur, there is no local overheating and destruction of the catalytic mass and other parts of the apparatus, and the secondary reactions above referred to, converting any carbon dioxide and water resulting from the primary reaction into carbon monoxide and hydrogen, are completed.

The deflector 12 performs several important functions. As indicated above it plays a quite important part in the mixing of the gas and air. In starting the apparatus a flame is apt to be formed at the orifice 11 and the deflector protects the catalytic mass from this flame until the operation is properly adjusted. An exothermic reaction occurs in the cavity of the deflector and the heat of this reaction is harmlessly transmitted through the mass of the deflector to the catalytic mass. It also serves to catch dirt particles accidentally in the air and gas and prevent them from depositing upon the catalytic mass and clogging its pores.

An important feature of the invention is that the mixture of air and gas is brought into contact with the porous catalytic mass at reacting temperature, but without flame, i. e. at a velocity higher than the velocity of flame propagation and then gradually slowed down within the catalytic mass by virtue of its shape, i. e. its gradually increasing cross section in the path of the gases. As a result the exothermic and endothermic stages of the reaction take place virtually simultaneously and the zoning with overheating at one point and a deficiency of heat for completing the reaction at another point in the catalytic mass is avoided. As is evident, if the highly exothermic stage of the reaction were permitted to take place before the gas mixture reached the catalytic mass the result would be a flame which would strike the catalytic mass and destroy it. On the other hand, if the high velocity of the gases exceeding the rate of flame propagation were maintained through the catalytic mass the reductions would not be completed.

The following specific conditions are illustrative. The pipe 1 is made of 10 gauge alloy steel 2 inches in diameter and 5 feet long, nozzled at one end to an orifice ½ inch in diameter. The pipe 2 is of the same material and ¾" diameter, but nozzled to a ⅜ inch orifice. The chamber 3 is 1½ inches in diameter and the orifice 11 is ¼ inch in diameter. The cavity 10 is 7 inches long and 6 inches in diameter at the grating 9. The deflector thimble is 3½ inches long, 1¼ inches maximum internal diameter and 2¼ inches maximum external diameter. The catalyst is crystalline alumina of 4 to 10 mesh size impregnated with nickel. Air is delivered into the chamber 3 at 900° C. and at the rate of 100 liters per minute and natural gas is delivered at the rate of 35 liters per minute, both gas and air under a gauge pressure of about 2 pounds per square inch. The gas passing out through the grating 9 is at a temperature of 1050–1100° C. The analysis of the natural gas used is:

|  | Per cent |
|---|---|
| Methane ($CH_4$) | 86.85 |
| Ethane ($C_2H_6$) | 7.86 |
| Propane ($C_3H_8$) | 3.87 |
| Higher paraffine hydrocarbons | 1.47 |

The gas produced is of the following composition:

| | Per cent |
|---|---|
| Methane ($CH_4$) | 0.5 |
| Carbon dioxide ($CO_2$) | 0.9 |
| Water ($H_2O$) | 0.9 |
| Carbon monoxide (CO) | 19.3 |
| Hydrogen ($H_2$) | 36.4 |
| Nitrogen | 41.9 |

It is understood that the composition and temperature of the gas produced may vary with the composition of the hydrocarbon or mixture used, the composition of the air or oxygen containing gas used in place of air, as well as by the operation of the process, including such factors as the efficiency of the catalyst, the accuracy of the adjustment of the gas and air supplies, etc., but in general it is possible to produce a gas at a temperature in the neighborhood of 1000° C. containing negligible amounts of hydrocarbon, and the higher oxidation products, water vapor and carbon dioxide, and consisting essentially of carbon monoxide and hydrogen with nitrogen. It will be appreciated also that the specific apparatus and procedure above described are merely illustrative and that my invention is not limited thereto.

I claim:

1. Process for continuously converting a hydrocarbon into a gaseous product consisting essentially of carbon monoxide and hydrogen and substantially free of carbon dioxide, water vapor and unreacted hydrocarbon which comprises mixing a stream of the hydrocarbon in gaseous state with a stream of an oxygen-containing gas in proportion substantially just sufficient to convert the carbon content of the hydrocarbon into carbon monoxide and at a temperature sufficient to initiate chemical reaction with the hydrocarbon, passing the mixture from the point of mixing into initial contact with a catalytic mass at a velocity at least sufficient to prevent flame, and subsequently gradually reducing the velocity of the mixture as it flows in contact with the catalytic mass while maintaining the velocity of the mixture sufficient to prevent flame.

2. A process for continuously converting a hydrocarbon into a gaseous product consisting essentially of carbon monoxide and hydrogen and substantially free of carbon dioxide, water vapor and unreacted hydrocarbons which comprises mixing a stream of the hydrocarbon in the gaseous state with a stream of an oxygen-containing gas preheated to a temperature sufficient to initiate chemical reaction with the hydrocarbon and in relative proportion substantially just sufficient to convert the carbon content of the hydrocarbon to carbon monoxide, passing the resulting mixture to and in contact with a solid incombustible contact mass, substantially precluding the presence of products of complete combustion in the mixture by maintaining the velocity thereof from the point of mixing to and in contact with said mass at a rate greater than the velocity required to prevent flame during mixing and causing controlled substantially complete conversion to carbon monoxide and hydrogen in the mixture without temperature or reaction zoning in the presence of the contact mass by gradually reducing the rate of flow of the mixture as it flows in contact with said mass while maintaining the velocity of the mixture through the contact mass sufficient to prevent flame.

3. Process as defined in claim 1 in which the oxygen-containing gas at the point of mixing with the hydrocarbon is at a temperature of at least about 800° C.

4. Process as defined in claim 1 in which the oxygen-containing gas is air.

5. Process as defined in claim 1 in which the hydrocarbon is supplied in the form of natural gas.

CHARLES G. MAIER.